United States Patent [19]

Ragan

[11] Patent Number: 5,494,211

[45] Date of Patent: Feb. 27, 1996

[54] THERMOSTAT BYPASS

[76] Inventor: Alton R. Ragan, Rte. 1, Box 71, Sparks, Okla. 74869

[21] Appl. No.: 387,533

[22] Filed: Feb. 13, 1995

Related U.S. Application Data

[63] Continuation of Ser. No. 187,573, Jan. 27, 1994, Pat. No. 5,388,760, which is a continuation of Ser. No. 974,400, Nov. 10, 1992, Pat. No. 5,282,828, which is a continuation of Ser. No. 709,520, Jun. 3, 1992, Pat. No. 5,163,613.

[51] Int. Cl.⁶ .......................................... F01P 7/16
[52] U.S. Cl. ................................. 236/34.5; 236/DIG. 2
[58] Field of Search ..................... 236/34, 34.5, DIG. 2

[56] References Cited

U.S. PATENT DOCUMENTS

| | | | |
|---|---|---|---|
| 2,833,478 | 5/1958 | Middleton | 236/34.5 |
| 3,365,130 | 1/1968 | Kamin et al. | 236/34.5 |
| 4,431,133 | 2/1984 | Roberson, Sr. | 236/34.5 |
| 4,979,671 | 12/1990 | Bigcharles | 236/34.5 |

OTHER PUBLICATIONS

Robertshaw Catalog 3810, Sep. 1988.

*Primary Examiner*—William E. Tapolcai
*Attorney, Agent, or Firm*—Dunlap & Codding

[57] ABSTRACT

A water cooled engine includes a thermostat interposed in a water flow passage way. The thermostat operates a valve which opens and closes to regulate the temperature of water. A bypass structure assembly is associated with the thermostat for permitting the flow of water through the thermostat to be controlled by the valve in the thermostat in an operating position of the bypass structure assembly and for bypassing the thermostat in a bypass position wherein water flows through the flow passageway bypassing the thermostat. A bypass position assembly is associated with the bypass structure assembly for positioning the bypass structure assembly in the operating position and in the bypass position.

4 Claims, 6 Drawing Sheets

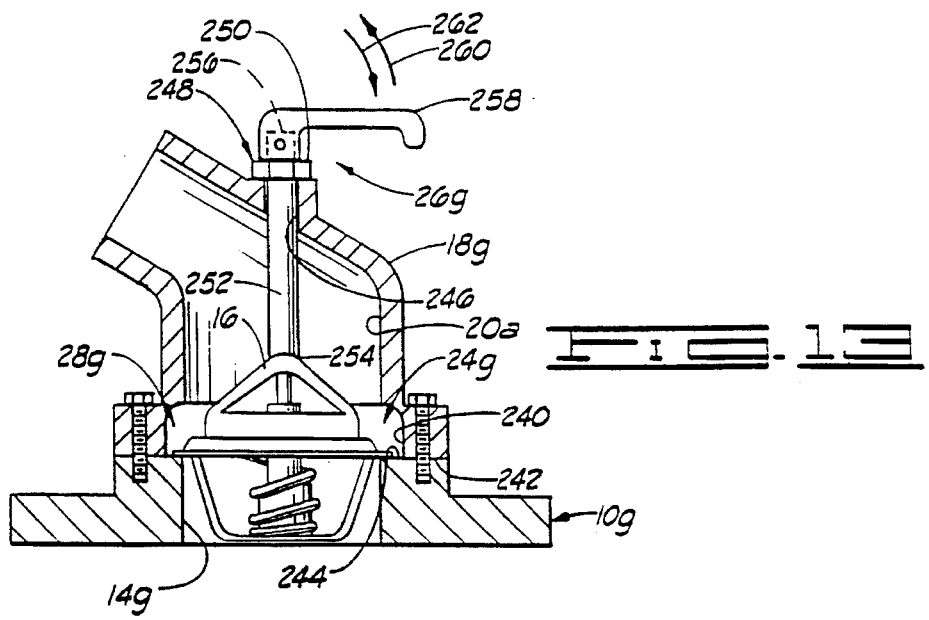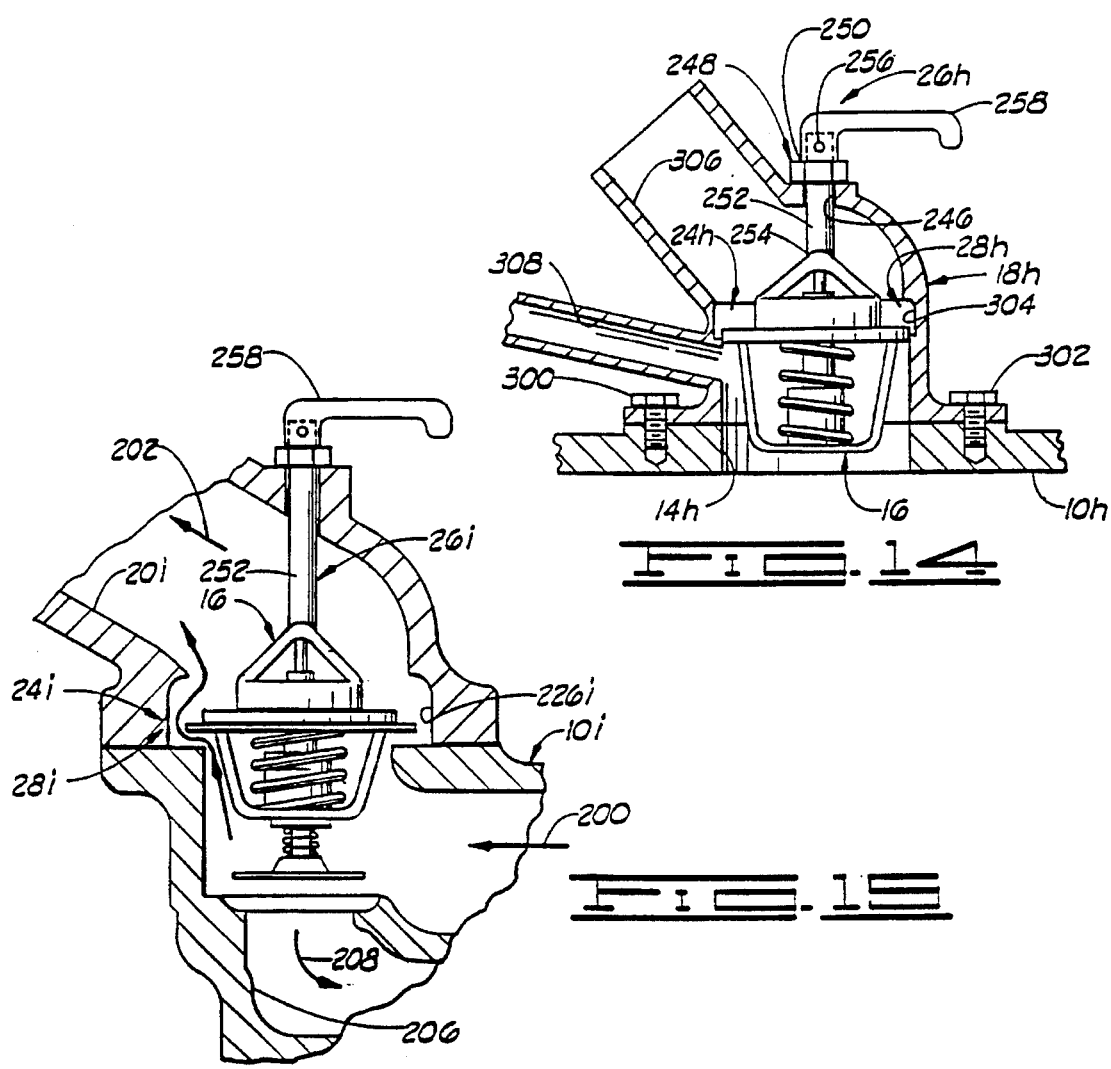

5,494,211

THERMOSTAT BYPASS

This application is a continuation of U.S. Ser. No. 08/187,573 U.S. Pat. No. 5,388,760, filed Jan. 27, 1994, which is a continuation of U.S. Ser. No. 07/974,400, filed Nov. 10, 1992, now U.S. Pat. No. 5,282,828, which is a continuation of U.S. Ser. No. 07/709,520, filed Jun. 3, 1992, now U.S. Pat. No. 5,163,613.

FIELD OF THE INVENTION

The present invention relates to a water cooled engine having a thermostat interposed in a water flow passageway wherein a bypass structure assembly has an operating position and a bypass position, the thermostat controlling the flow of water in the operating position of the bypass structure assembly and the water flow bypassing the thermostat in the bypass position of the bypass structure assembly.

BRIEF DESCRIPTION OF THE DRAWINGS

FIG. 13 is a sectional view showing another modified bypass structure assembly and modified bypass position assembly and showing a portion of an intake manifold and a water neck of a water cooled engine.

FIG. 14 is a sectional view showing another modified bypass structure assembly and modified bypass position assembly and showing a portion of an intake manifold and a water neck of a water cooled engine.

FIG. 15 is a sectional view showing another modified bypass structure assembly and modified bypass position assembly and showing a portion of an intake manifold and a water neck of a water cooled engine.

DESCRIPTION OF THE PREFERRED EMBODIMENTS

In a water cooled engine, a thermostat controls the flow of water in the engine cooling system. The thermostat operates a thermostat valve which opens when the water reaches a certain temperature. This allows the water to circulate through the radiator and through the water jacket that surrounds the engine. If the thermostat valve sticks in the closed position, water is not permitted to flow through the cooling system and this can result in permanently damaging the engine.

Figure 1:
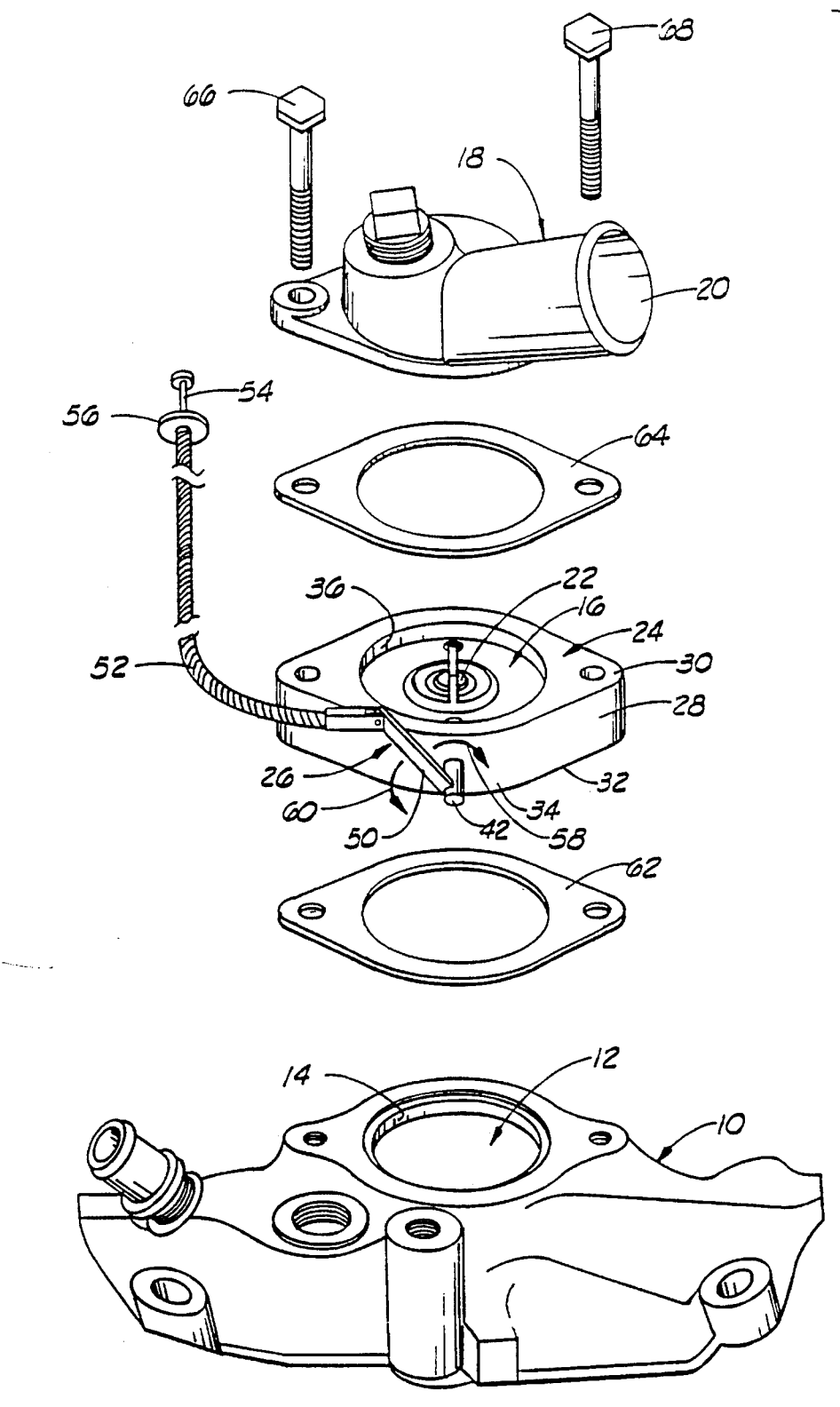
FIG. 1 is an exploded view showing the intake manifold and water neck portion of an air cooled engine and showing a bypass structure assembly and a bypass position assembly constructed in accordance with the present invention and associated with a thermostat.

The present invention relates to an improvement in a water cooled engine having a thermostat interposed in the water flow passageway. Shown in FIG. 1 is an intake manifold 10 portion of a water cooled engine having a portion of a water flow passageway 12 formed therethrough. The water flows through the water flow passageway 12 and out a water opening 14 in the intake manifold. 10. A thermostat 16 is interposed in the water flow passageway 12 generally between the intake manifold 10 and a water neck 18. The water neck 18 has a water opening 20 formed therethrough with the water openings 14 and 20 constituting a portion of the water flow passageway 12. The thermostat 16 has a thermostat valve 22. The thermostat valve 22 opens and closes to regulate the temperature of the water flowing through the water flow passageway 12 and flowing through the engine cooling system. The thermostat 16 is a conventional, commercially available thermostat.

Water cooled engines with water flow passageways and a thermostat for controlling the flow of water through such water flow passageways are well known in the art and a detailed description of such is not deemed necessary herein. Further, it is well known in the art to interpose the thermostat generally between an intake manifold and a water neck.

The present invention includes a bypass structure assembly 24 and a bypass position assembly 26, as shown in FIG. 1. The bypass structure assembly 24 is adapted to permit the flow of water through the thermostat 16 to be controlled by the thermostat valve 22 in the thermostat 16 in an operating position of the bypass structure assembly 24 and to permit the water to bypass the thermostat 16 in a bypass position of the bypass structure assembly 24 thereby permitting water to flow through the flow passageway bypassing the thermostat 16. The bypass position assembly 26 is adapted to position the bypass structure assembly 24 in the operating position and in the bypass position.

More particularly, in the embodiment in the invention shown in FIGS. 1–4, the bypass structure assembly 24 provides a means for supporting the thermostat 16 on a portion of the engine interposed in the water flow passageway 12 for movement of the thermostat 16 from the operating position wherein water flows through the water flow passageway and is controlled by the thermostat valve 22 and for supporting the thermostat 16 so that the thermostat 16 substantially is sealed against a portion of the engine in the operating position of the bypass structure assembly 24. The thermostat 16 is movable from the operating position to the bypass position wherein water is permitted to bypass the thermostat 16. The bypass position assembly 26 more particularly is adapted to move the thermostat 16 from the operating position to the bypass position.

The bypass structure assembly 24 includes a thermostat insert 28, as shown in FIGS. 1–4. The thermostat insert 28 has an upper end 30, a lower end 32 and an outer peripheral surface 34. A thermostat opening 36 is formed through the thermostat insert 28 intersecting the upper and the lower ends 30 and 32.

A first shaft opening 38 (FIG. 4) is formed through the thermostat insert 28. The first shaft opening 38 intersects the outer peripheral surface 34 and extends through the thermostat insert 28 intersecting the thermostat opening 36.

A second shaft opening 40 (FIG. 4) is formed through the thermostat insert 28. The second shaft opening 40 extends through the outer peripheral surface 34 of the thermostat insert 28 and intersects the thermostat opening 36.

The second shaft opening 40 is aligned with the first shaft opening 38. A first shaft 42 is disposed through the first shaft opening 38. The first shaft 42 is generally supported within the first shaft opening 38. A second shaft 44 (FIGS. 3 and 4) is disposed through the second shaft opening 40. The second shaft 44 is generally disposed in the second shaft opening 40.

Figure 2:
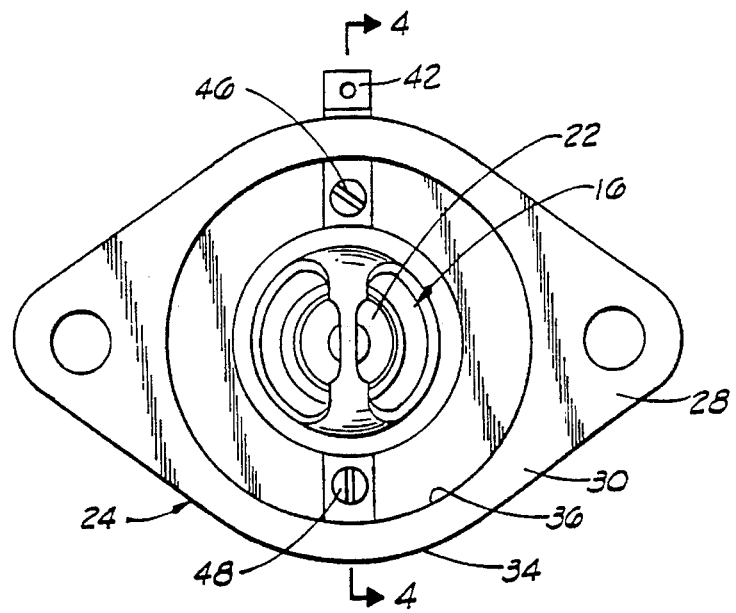
FIG. 2 is a top elevational view of the bypass position assembly and bypass structure assembly of FIG. 1 showing the bypass structure assembly positioned in the operating position.
Figure 3:
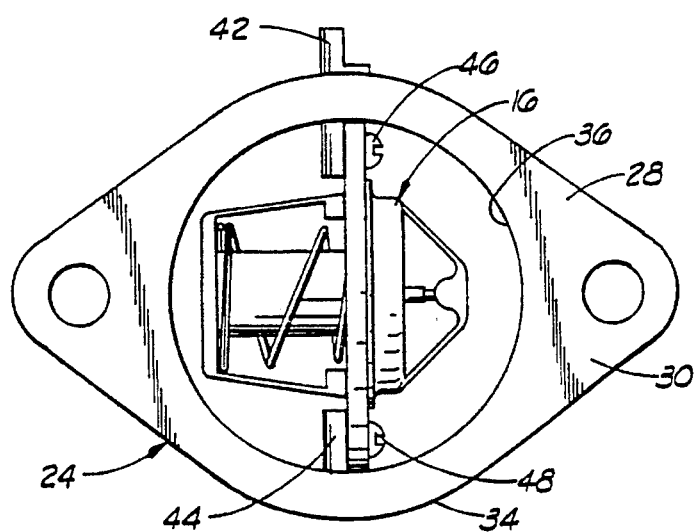
FIG. 3 is a top elevational view, similar to FIG. 2, but showing the bypass structure assembly in the bypass position.
Figure 4:
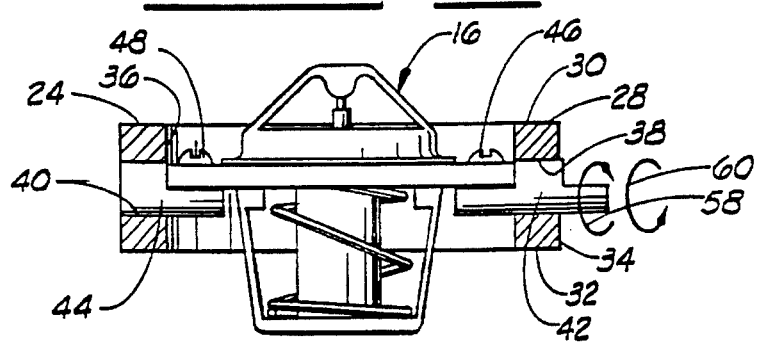
FIG. 4 is a sectional view taken substantially along the lines 4—4 of FIG. 2.

The thermostat opening 36 is sized to receive the thermostat 16. The thermostat 16 is disposed in the thermostat opening 36. One end of the first shaft 42 is secured to the thermostat 16 by way of a screw 46 (FIGS. 2–4). One end of the second shaft 44 is secured to the thermostat 16 by way of a screw 48 (FIGS. 2–4).

A portion of the first shaft 42 extends a distance beyond the outer peripheral surface 34 of the thermostat insert 28. One end of a handle 50 (FIG. 1) is secured to the first shaft 42. A cable 52 (FIG. 1) having a wire rod 54 (FIG. 1) disposed therethrough is connected to the handle 50. More particularly, one end of the wire rod 54 is secured to the handle 50.

The cable 52 and wire rod 54 extend a distance from the thermostat insert 28 and the opposite end of the cable 52 is supported on a portion of the vehicle having the bypass structure assembly 24 and bypass position assembly 26 disposed therein, the portion of the vehicle being designated in FIG. 1 by the general reference numeral 56 for example. The cable 52 and wire rod 54 could extend through the dashboard area of the vehicle so that a portion of the wire rod 54 is near the operator of the vehicle and operable by the operator, for example. It should be noted that the cable 52 and the wire rod 54 could be mounted on any portion of the vehicle for remotely operating the bypass structure assembly 24.

The first and the second shafts 42 and 44 and the thermostat 16 connected thereto are rotatable in one direction 58 (FIGS. 1 and 4) and in an opposite direction 60 (FIGS. 1 and 4).

A gasket 62 (FIG. 1) is disposed on the intake manifold 10 generally over the water opening 14. The thermostat insert 28 is disposed on the gasket 62 with the lower end 32 of the thermostat insert 28 being disposed adjacent the gasket 62. A second gasket 64 (FIG. 1) is disposed on the upper end of the thermostat insert 28 and the water neck 18 is disposed on the gasket 64. In this position as shown in FIG. 1, the water neck 18 is connected by way of bolts 66 and 68 to the intake manifold 10 with the thermostat 16 being disposed generally between the water neck 18 and the intake manifold 10 by way of bolts 66 and 68.

Initially, the handle 50 is rotated in the direction 58 or 60 to position the thermostat in the operating position (shown in FIGS. 1, 2 and 4) wherein the thermostat 16 extends over and encompasses the thermostat opening 36. In this position of the thermostat 16, water flows from the intake manifold 10 through the water opening 14 and into the thermostat opening 36. The flow of water through the thermostat opening 36 is controlled by the thermostat valve 22. In the opened position of the thermostat valve 22, the water flows through the thermostat opening 36 and into and through the portion of the water flow passageway in the water neck 18 with the water being discharged from the water neck 18 by way of the water opening 14.

If the thermostat valve 22 becomes stuck in the closed position, the operator can pull the wire rod 54 thereby moving the handle in the direction 58 or 60 thereby rotatingly moving the thermostat 16 in the direction 58 or 60 to position the thermostat 16 at an angle with respect to the thermostat opening 36 thereby positioning the thermostat 16 in the bypass position (shown in FIG. 3). In the bypass position, portions of the thermostat 16 are removed from the thermostat opening 36 for permitting water to pass through the thermostat opening 36 between the thermostat 16 and the thermostat insert 28 and bypassing the thermostat 16.

In the operating position, the thermostat 16 engages portions of the thermostat insert 28 for substantially closing the thermostat opening 36 and preventing water from passing through the thermostat opening 36 between the thermostat 16 and the portion of the thermostat insert 28 formed by the thermostat opening 36. The operator can return the thermostat 16 to the operating position by moving the wire rod 54 and causing the handle 50 to be moved in the direction 58 or 60 for rotating the thermostat 16 in the thermostat opening 36 until the thermostat 16 has been rotated back to the operating position wherein the thermostat substantially encompasses and closes the thermostat opening 36.

In some embodiments, the thermostat insert 28 can be incorporated as an integral part of the intake manifold 10 or as part of the water neck 18 or portions of the thermostat insert 28 could be formed in the intake manifold 10. In another embodiment, the thermostat insert 28 could be formed in a portion of the water neck 18 thereby eliminating the need for a separate thermostat insert such as the thermostat insert 28.

It also should be noted that it is not necessary to include the cable 52 and wire rod 54. In this last mentioned embodiment, the operator of the vehicle merely would grip the handle 50 and move the handle 50 in the directions 58 and 60 for positioning the thermostat 16 in the operating position and in the bypass position. The cable 52 and wire rod 54 merely permit the handle 50 to be operated from a position remote from thermostat 16 and the thermostat insert 28.

It should be noted that the bypass structure assembly 24 also could comprise a separate conduit extending around the thermostat between the intake manifold 10 and the water neck 18 with a valve interposed in the conduit. The valve would be operated by a valve handle on a valve stem extending outwardly from the conduit for opening and closing the conduit. In this embodiment, the valve handle would comprise the bypass position assembly 26.

The bypass structure assembly 24 comprises the thermostat insert 28 and the first and the second shafts 42 and 44 for rotatably supporting the thermostat 16 and the thermostat opening 36. The bypass position assembly 26 comprises the handle 50, the cable 52 and wire rod 54.

EMBODIMENT OF FIGS. 5 AND 6

Figure 5:
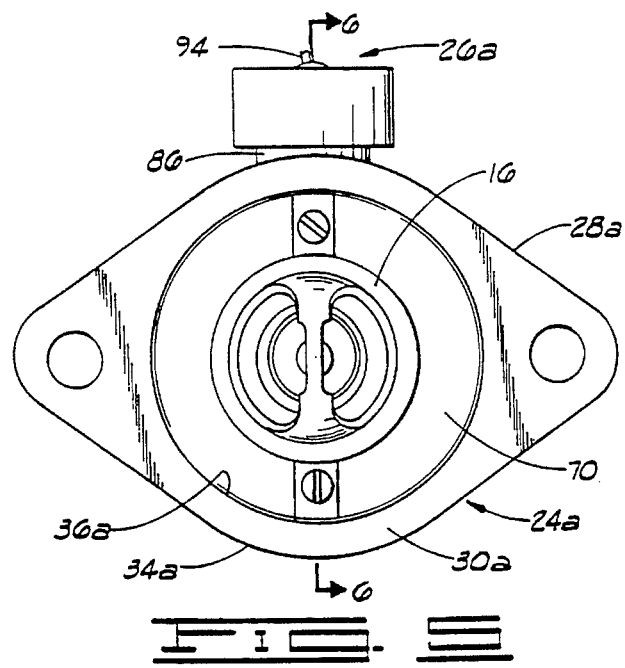
FIG. 5 is a top elevation view of a modified bypass structure assembly and a modified bypass position assembly.
Figure 6:
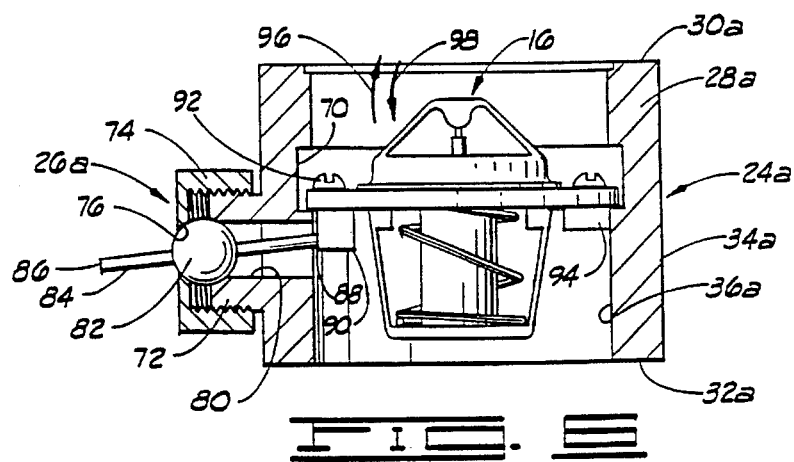
FIG. 6 is a view of the bypass structure assembly and positioned assembly of FIG. 5, taken substantially along the lines 6—6 of FIG. 5.

Shown in FIGS. 5 and 6 is a modified bypass structure assembly 24a, a modified bypass position assembly 26a and a modified thermostat insert 28a.

The modified thermostat insert 28a includes a recess 70 formed in the thermostat opening 36a between the upper end 30a and the lower end 32a. The recess 70 has a diameter larger than the diameter of the thermostat 16.

A protrusion 72 is formed on the outer peripheral surface 34a. The protrusion 72 extends a distance radially outwardly from the outer peripheral surface 34a. A portion of the protrusion 72 is threaded. A cap 74 is threadedly connected to the protrusion 72. An opening 76 is formed through the cap 74.

A shaft opening 80 extends through the protrusion 72 intersecting the thermostat opening 36a and intersecting the outer end of the protrusion 72. A ball 82 is disposed in the cap 74. The ball 82 bearingly engages a portion of the cap 74 formed by the opening 76 and bearingly engages a portion of the protrusion 72.

A handle 84 extends through the shaft opening 80. The handle 84 has opposite ends 86 and 88. The end 86 of the handle 84 extends a distance beyond the outer peripheral surface 34a of the thermostat insert 28a and a distance beyond the cap 74. A bar 90 is connected to the end 88 of the handle 84. The bar 90 is connected to a portion of the thermostat by way of a fastener 92. A portion of the thermostat 16 also is pivotally connected to a portion of the thermostat insert 28a by way of a pivot connection 94. The thermostat 16 is movable in a pivotal direction 96 and in an opposite pivotal direction 98 about the pivot connection 94.

In operation, the end 86 of the handle 84 is moved in an upwardly direction thereby causing the end 88 to be moved in a downwardly direction thereby moving the thermostat 16 to the operating position wherein the thermostat 16 substantially encompasses the thermostat opening 36a. In this operating position, the thermostat valve of the thermostat 16 controls the flow of fluid through the thermostat opening 36a and the thermostat insert 28a. When it is desired to move the thermostat 16 to the bypass position, the end 86 of the handle 84 is moved in a downwardly direction thereby causing the end 88 and the bar 90 to be moved in the upwardly direction for causing the thermostat 16 to be moved in the direction 96 to a bypass position wherein the water flowing through the thermostat opening 36a flows around and bypasses the thermostat 16 and the thermostat valve therein.

Figure 7:
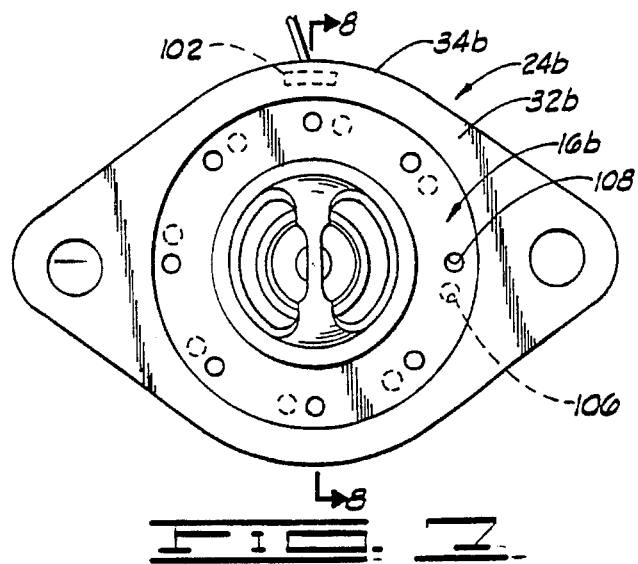
FIG. 7 is a top elevational view of another modified bypass structure assembly and modified bypass position assembly.
Figure 8:
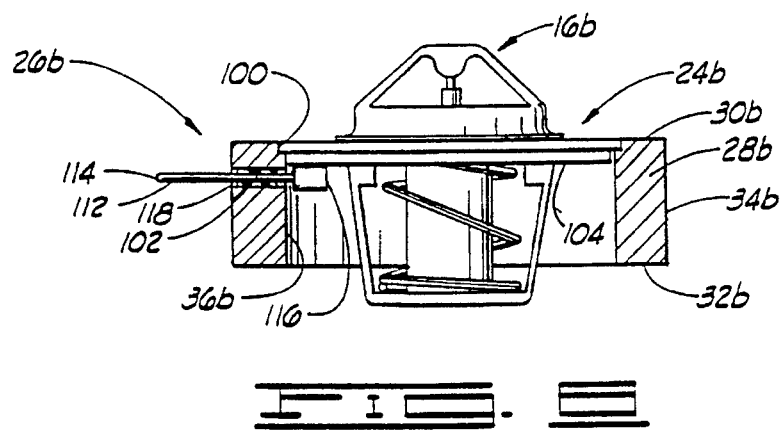
FIG. 8 is a sectional view taken substantially along the lines 8—8 of FIG. 7.

EMBODIMENT OF FIGS. 7 and 8

Shown in FIGS. 7 and 8 is a modified bypass structure assembly 24b and a modified bypass position assembly 26b. The modified bypass structure assembly 24b includes a modified thermostat insert 28b.

The modified thermostat insert 28b includes a recess 100 (FIG. 8) in the upper end 30b of the modified thermostat insert 28b. The thermostat 16 is disposed in the thermostat opening 36b with a portion of the thermostat 16 resting on the recess 100.

The modified thermostat insert 28b does not include shaft openings like the shaft openings 38 and 40 shown in FIG. 4. Rather, the thermostat insert 28b includes an arcuate slot 102 (FIG. 8) formed through the thermostat insert 28b with the arcuate slot 102 intersecting the outer peripheral surface 34b and the thermostat opening 36b. A valve member 104 (FIG. 8) is disposed in the thermostat opening 36b with the valve member 104 being disposed generally adjacent a portion of the thermostat 16.

A plurality of bypass openings 106 are formed through the valve member 104 with the bypass openings 106 being spaced circumferentially about the outer peripheral surface of the valve member 104 (only one of the bypass openings 106 being designated with a specific reference numeral in FIG. 7 and the bypass openings being shown in dashed lines in FIG. 7).

A plurality of bypass openings 108 are formed through the thermostat 16. Each of the bypass openings 108 are spaced circumferentially about the outer peripheral surface of the thermostat 16. Only one of the bypass openings 108 is designated with a specific reference numeral in FIG. 7.

A handle 112 is disposed through the slot 102. The handle 112 has opposite ends 114 and 116. The end 116 is disposed in the thermostat opening 36b and positioned generally adjacent the valve member 104. The end 116 of the handle 112 is securely connected to the valve member 104. The end 114 of the handle 112 extends a distance beyond the outer peripheral surface 34b of the thermostat insert 28b. A seal member 118 is disposed in the slot 102 for sealing between the handle 112 and the thermostat insert 28b.

In an operating position, the bypass openings 106 in the valve member 104 are not aligned with the bypass openings 108 in the thermostat 16b, as shown in FIG. 7, thereby directing the flow of fluid through the thermostat opening 36b through the thermostat 16b. If it is desired to move the bypass structure assembly 24b to the bypass position, an individual grips the handle 112 near the end 114 thereof and slides the handle 112 in the slot 102 to a position wherein the bypass openings 106 in the valve member 104 are aligned with the bypass openings 108 in the thermostat 16b. In this bypass position, water flows through the bypass openings 108 and 106 bypassing the valve member in thermostat 16b.

EMBODIMENT OF FIG. 9

Figure 9:
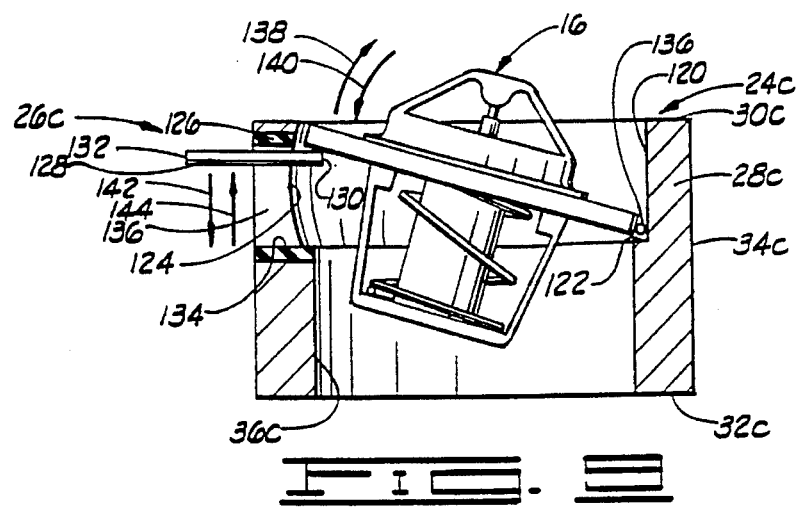
FIG. 9 is a sectional view of another modified bypass structure assembly and modified bypass position assembly.

Shown in FIG. 9 is a modified bypass structure assembly 24c and a modified bypass position assembly 26c. The modified bypass structure assembly 24c includes a modified thermostat insert 28c.

The modified insert 28c includes a recess 120 formed through the upper end 30c thereof and extending a distance generally toward the lower end 32c forming an annular ledge 122 in the thermostat opening 36c. A portion of the surface formed by the recess 120 is shaped in the form of an arc 124 with the arc 124 extending generally between the upper end 30c of the thermostat insert 28c and the ledge 122.

The thermostat 16 is disposed in the thermostat opening 36c and positioned on the ledge 122 in the operating position of the thermostat 16. A slot 126 is formed through the thermostat insert 28c with the slot 126 intersecting the thermostat opening 36c and a portion of the outer peripheral surface 34c of the thermostat insert 28c. A handle 128 is disposed through the slot 126.

The handle 128 has opposite ends 130 and 132. The end 130 of the handle 128 is disposed generally below a portion of the thermostat 16. The end 132 of the handle 128 extends a distance beyond the outer peripheral surface 34c of the thermostat insert 28c.

An elastomeric seal member 134 is disposed in the slot 126. The elastomeric seal member 134 includes a slot 136 formed therethrough. The handle 128, more particularly, extends through the slot 136 in the elastomeric member 134.

The thermostat 16 is pivotally connected to the thermostat insert 28c by way of a pivotal connection 136. The thermostat 16 is pivotally connected to the thermostat insert 28c for pivotal movement in a direction 138 and in an opposite direction 140.

In operation, the handle 128 is moved in a downwardly direction 142 thereby allowing a thermostat 16 to be pivotally moved in the direction 140 to a position wherein the thermostat rests on the ledge 122. In this position, the bypass structure assembly 24c is in the operating position and the flow of water through the thermostat opening 36c is controlled by the thermostat valve in the thermostat 16.

If it is desired to move the thermostat 16 to the bypass position, the handle 128 is moved in the upwardly direction 144 thereby pivotally moving the thermostat 16 in the direction 138 to a position wherein a portion of the thermostat 16 is removed from the thermostat opening 36c thereby allowing water to flow through the thermostat opening 36c bypassing the thermostat 16 and the thermostat valve therein.

EMBODIMENT OF FIG. 10

Figure 10:
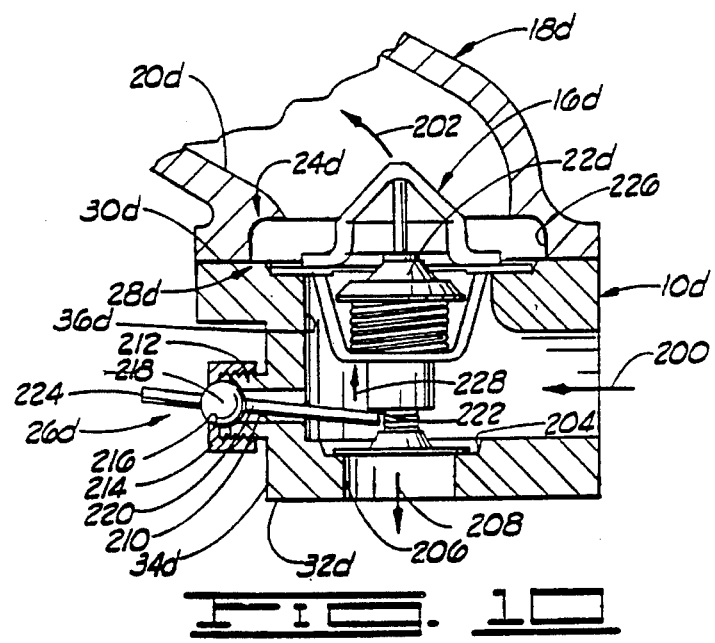
FIG. 10 is a sectional view of another modified bypass structure assembly and modified bypass position assembly.

Shown in FIG. 10 is a modified thermostat 16d having a modified thermostat valve 22d therein. The thermostat valve 22d is shown in the opened position in FIG. 10. The thermostat 16d is mounted in a modified intake manifold 10d which is connected to a modified water neck 18d. In this embodiment, a modified thermostat insert 28d comprises an integral portion of the intake manifold 10d.

Water flows from the engine in a direction 200. In the opened position of the thermostat valve 22d, the water flows through the thermostat insert 28d and through the thermostat 16d and into the water neck 18d in a direction 202. The water flowing in the direction 202 flows through the water neck 18d and into the radiator.

With the type of thermostat 16d shown in FIG. 10 and the modified intake manifold insert 10d, a portion of the thermostat 16d is seated on a seat 204 formed in the intake manifold insert 10d. The seat 204 surrounds a bypass opening 206. The thermostat 16d operates to move the portion of the thermostat seated against the seat 204 in an upwardly direction when the engine first is started thereby unseating the thermostat from the seat 204 and permitting the water to flow in the direction 200 and flow through the bypass opening 206 in a direction 208 back to the engine. When the water or coolant warms to a predetermined temperature, the thermostat 16d operates to again seat the portion of the thermostat against the seat 204 thereby closing the bypass opening 206. Thermostats which operate in the manner just described with respect to the thermostat 16d are commercially available and are well known in the art and a detailed description of such thermostats is not deemed necessary herein.

The modified insert 28d includes a handle opening 210 which extends through the modified insert 28d intersecting the outer peripheral surface 34d thereof. A protrusion 212 is formed on the outer peripheral surface 34d with the protrusion 212 extending a distance radially outwardly from the outer peripheral surface 34d. A portion of the protrusion 212 is threaded and a cap 214 is threadedly secured to the protrusion 212.

An opening 216 is formed through the cap 214. A ball 218 is disposed in the cap 214 and the ball 218 generally engages a portion of the cap 214 and a portion of the protrusion 212.

A handle 220 extends through the ball 218 and the handle 220 is secured to the ball 218. The handle 220 has opposite ends 222 and 224. The end 224 of the handle 220 extends a distance from the outer peripheral surface 34d of the thermostat insert 28d. The end 222 of the handle 220 is disposed under and engages a portion of the thermostat 16d. The end 222 of the handle 220 may be secured to the thermostat 16d.

A portion of the water neck 18d also comprises a portion of the modified insert 28d. In particularly, a recess 226 is formed in the water neck 18d with the recess 226 generally surrounding the water opening 20d. The recess 226 has a diameter larger than the diameter of the thermostat 16d.

The thermostat 16d is shown in the operating position in FIG. 10 wherein the thermostat valve 22d controls the flow of water through the thermostat and through the water opening 20d and the water neck 18d. If it is desired to move the thermostat 16d to the bypass position, the end 224 of the handle 220 is moved in a downwardly direction thereby causing the end 222 of the handle 220 to be moved in an upwardly direction 228 moving the thermostat 16d in the upwardly direction 228. As the thermostat 16d is moved in the upwardly direction 228, the thermostat 16d is moved through the recessed 226 to the bypass position permitting water to flow through the thermostat opening 36d and around the thermostat 16d through the recess 226 thereby bypassing the thermostat 16d. The handle 220 is moved in an upwardly direction for causing the end 222 of the handle 220 to be moved in a downwardly direction opposite the direction 228 for repositioning the thermostat 16d in the operating position as shown in FIG. 10.

In this embodiment, the thermostat insert 28d comprises a portion of the intake manifold 10d and the recess 226 portion of the water neck 18d.

EMBODIMENT OF FIG. 11

Figure 11:
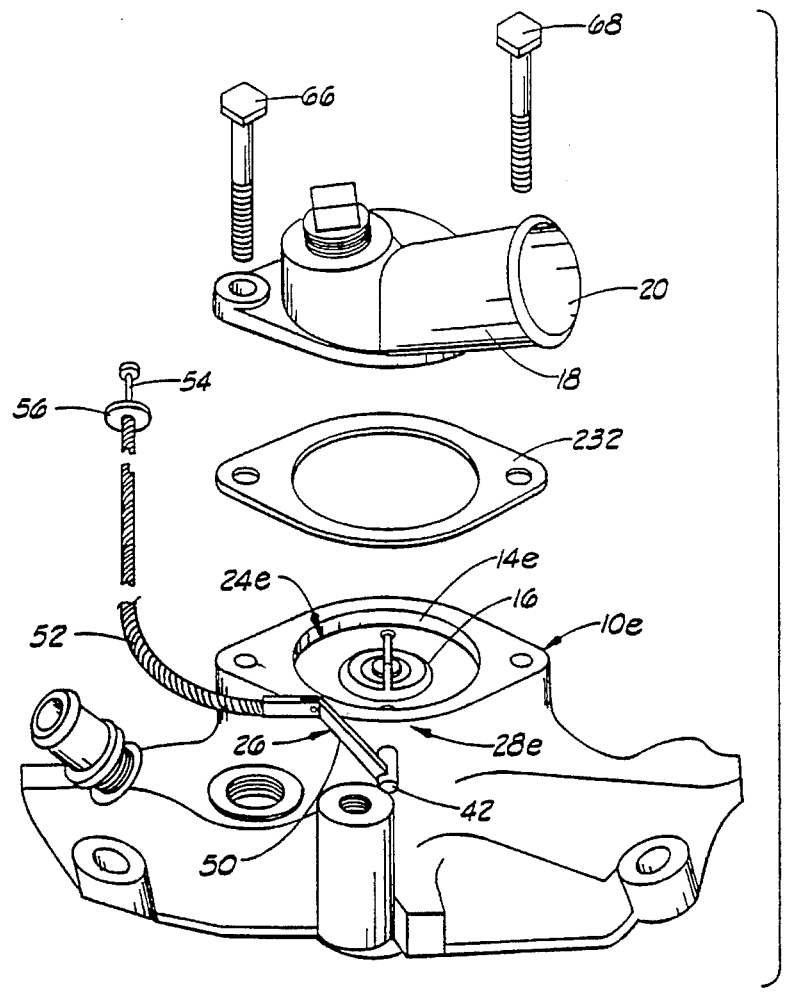
FIG. 11 is an exploded view showing another modified bypass structure assembly and modified bypass position assembly and showing an intake manifold and water neck portion of a water cooled engine.

Shown in FIG. 11 is a modified bypass structure assembly 24e consisting of a modified thermostat insert 28e cooperating with a bypass position assembly 26 which is constructed exactly like the bypass position assembly 26 shown in FIG. 1 and described in detail before.

The thermostat insert 28e is constructed exactly like the thermostat insert 28 shown in FIGS. 1, 2, 3 and 4 and described in detail before, except the thermostat insert 28e is an integral part of the intake manifold 10e with the thermostat 16 being rotatably mounted in the water opening 14e of the intake manifold 10e.

In this embodiment, the water neck 18 is mounted directly to the intake manifold by way of the bolts 66 and 68 with a single gasket 232 being interposed between the water neck 18 and the intake manifold 10e.

EMBODIMENT OF FIG. 12

Figure 12:
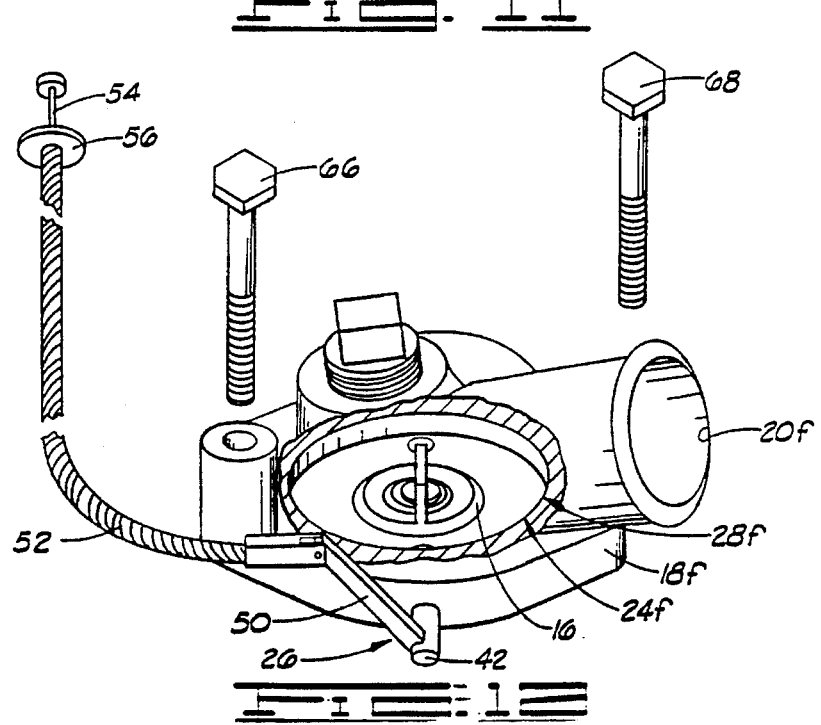
FIG. 12 is a partial perspective, partial sectional view of another modified bypass structure assembly and modified bypass position assembly and showing a portion of a water neck portion of a water cooled engine.

Shown in FIG. 12 is a water neck 18f which is constructed exactly like the water neck 18 shown in FIG. 1 and described in detail before, except the bypass structure assembly 24f is incorporated in the water neck 18f. The bypass structure assembly 24f is constructed exactly like the bypass structure assembly 24 shown in FIG. 1, except the thermostat insert 28f is incorporated as an integral part of the water neck 18f rather than being a separate element. The thermostat insert 28f is operated by a bypass position assembly 26 which is constructed exactly like the bypass position assembly 26 shown in FIG. 1 and described in detailed before. The bypass position assembly 26 operates and functions to move the bypass structure assembly 24f in the operating position and in the bypass position in a manner exactly like that described before in connection with the embodiment shown in FIG. 1. The water neck 18f is bolted to the intake manifold 10 (shown in FIG. 1) by way of the bolts 66 and 68 with a gasket (not shown) being interposed between the water neck 18f and the intake manifold 10.

EMBODIMENT OF FIG. 13

Shown in. FIG. 13 is a modified bypass structure assembly 24g and a modified bypass position assembly 26g. The bypass structure assembly 24g includes a modified thermostat insert 28g. The thermostat insert 28g is incorporated in the modified water neck 18g and includes a counterbore 240 formed in an end 242 of the water neck 18g. The thermostat 16 is disposed generally within the counterbore 240 and positioned on an upper end 244 of a modified intake manifold 10g. The modified intake manifold 10g, as shown in FIG. 13, more particularly, is a portion of an engine cylinder head.

An opening 246 is formed through the water neck 18g generally directly above the thermostat 16. A housing 248 is disposed in the opening 246 with the housing 248 extending a distance above the water neck 18g terminating with an upper end 250.

A rod 252 extends through the housing 248. The rod 252 has opposite ends 254 and 256. The end 254 of the rod 252 is secured to the thermostat 16. The end 256 of the rod 252 extends through the housing 248 and extends a distance beyond the upper end 250 of the housing 248. The end 256 of the rod 252 is pivotally connected to one end of a handle 258. The handle 258 is movable in directions 260 and 262.

In the operating position, the thermostat 16 is seated on the upper end 244 of the intake manifold 10g as shown in FIG. 13. To move the thermostat to the bypass position, the handle 258 is moved in the upwardly direction 260 with portions of the handle 258 engaging portions of the housing 248 causing the rod 252 to be moved in the upwardly direction. The movement of the rod 252 in the upwardly direction causes the thermostat 16 to be moved in the upwardly direction to the bypass position wherein the water flows around the thermostat 16 through portions of the counterbore 240.

EMBODIMENT OF FIG. 14

Shown in FIG. 14 is a modified bypass structure assembly 24h and a modified bypass position assembly 26g associated with a modified water neck 18h and a modified intake manifold 10h. The intake manifold 10h more particularly is an engine cylinder head. The water neck 18h is secured to the intake manifold 10h by way of bolts 300 and 302. The bypass structure assembly 24h includes a recess 304 formed in the water neck 18h. The thermostat 16 is seated on a portion of the water neck 18h and positioned generally within the recess 304. The water neck 18h includes one water passageway 306 which passes water to the radiator and a second water passageway 308 which passes water to the heater.

The bypass position assembly 26h is constructed exactly like the bypass position assembly 26f shown in FIG. 13 and described in detail before.

The thermostat 16 is shown in the operating position in FIG. 14. To move the thermostat 16 to the bypass position, the handle 258 is moved in the upwardly direction thereby causing the rod 252 and the thermostat 16 connected thereto to be moved in the upward direction to a position wherein the water flows past the thermostat and through portions formed by the recess 304 and the water neck 18h thereby passing the thermostat 16.

EMBODIMENT OF FIG. 15

Shown in FIG. 15 is a modified bypass structure assembly 24i and a modified bypass position assembly 26i. The modified bypass structure assembly 24i includes the modified thermostat insert 28i which is incorporated as part of the water neck 18i. The water neck 18i and the intake manifold 10i are constructed like the water neck 18d and the intake manifold 10d shown in FIG. 10.

The thermostat insert 28i is constructed like the thermostat insert 28d shown in FIG. 10. The bypass position assembly 26i is constructed exactly like the bypass position assembly 26g shown in FIG. 3.

The thermostat 16 is shown in FIG. 15 in the bypass position. To move the thermostat 16 to the bypass position or to the operating position, the individual operates the handle 258 in a manner exactly like that described before in connection with FIG. 13.

Changes may be made in the construction and the operation of the various components, elements and assemblies described herein and without departing from the spirit and scope of the invention as defined in the following claims.

What is claimed is:

1. An improvement in a water cooled engine having a thermostat interposed in a water flow passageway wherein the thermostat has a thermostat valve which opens and closes for regulating the temperature of the water, the engine includes an intake manifold having a water opening extending through a portion thereof, the improvement comprising:

bypass structure means for receiving the thermostat so that the flow of water through the thermostat is controlled by the thermostat valve in an operating position of the thermostat and so that the flow of water through the flow passageway bypasses the thermostat in a bypass position of the thermostat, the bypass structure means comprising:

a thermostat insert having an outer peripheral surface and a thermostat opening formed therethrough, the thermostat insert formed integrally with the intake manifold such that the thermostat opening is aligned with the water opening in the intake manifold, the thermostat being disposed in the thermostat opening of the thermostat insert such that the thermostat extends generally across and encompasses the thermostat opening in the operating position and such that the thermostat is disposed at an angle with respect to the thermostat opening in the bypass position so that water is able to flow through the thermostat opening and about the thermostat thereby bypassing the thermostat valve; and bypass position means for positioning the thermostat in the operating position and for positioning the thermostat in the bypass position, the bypass position means comprising:

means for pivotally connecting the thermostat to the thermostat insert so that the thermostat is positionable between the operating position and the bypass position; and a handle having one end connected to the pivot means, the handle being adapted to rotate the thermostat between the operating position and the bypass position.

2. The improvement of claim 1 wherein the thermostat insert is provided with a shaft opening formed through the thermostat insert extending from the thermostat opening to the outer peripheral surface of the thermostat insert, and wherein the pivot means comprises a shaft pivotally disposed through the shaft opening and connected to the thermostat.

3. An improvement in a water cooled engine having a thermostat interposed in a water flow passageway wherein the thermostat has a thermostat valve which opens and closes for regulating the temperature of the water, the engine includes an intake manifold having a water opening extending through a portion thereof and a water neck having a water opening extending through a portion thereof, the intake manifold being connected to the water neck whereby the water opening in the intake manifold is aligned with the water opening in the water neck, the improvement comprising:

bypass structure means for receiving the thermostat so that the flow of water through the thermostat is controlled by the thermostat valve in an operating position of the thermostat and so that the flow of water through the flow passageway bypasses the thermostat in a bypass position of the thermostat, the bypass structure means comprising:

a thermostat insert having an outer peripheral surface and a thermostat opening formed therethrough, the thermostat insert integrally formed with the water neck such that the thermostat opening is aligned with the water opening in the water neck, the thermostat being disposed in the thermostat opening of the thermostat insert such that the thermostat extends generally across and encompasses the thermostat opening in the operating position and such that the thermostat is disposed at an angle with respect to the thermostat opening in the bypass position so that water is able to flow through the thermostat opening and about the thermostat thereby bypassing the thermostat valve; and bypass position means for positioning the thermostat in the operating position and for positioning the thermostat in the bypass position, the bypass position means comprising:

means for pivotally connecting the thermostat to the thermostat insert so that the thermostat is positionable between the operating position and the bypass position; and a handle having one end connected to the pivot means, the handle being adapted to rotate the thermostat between the operating position and the bypass position.

4. The improvement of claim 3 wherein the thermostat insert is provided with a shaft opening formed through the thermostat insert extending from the thermostat opening and the outer peripheral surface of the thermostat insert, and wherein the pivot means comprises a shafted pivotally disposed through the shaft opening and connected to the thermostat.

* * * * *